US010678397B2

(12) United States Patent
Tsai et al.

(10) Patent No.: US 10,678,397 B2
(45) Date of Patent: Jun. 9, 2020

(54) METHOD FOR PROVIDING DEMONSTRATION INFORMATION IN SIMULATION ENVIRONMENT, AND ASSOCIATED SIMULATION SYSTEM

(71) Applicant: HTC Corporation, Taoyuan (TW)

(72) Inventors: Joseph Chengwei Tsai, Taoyuan (TW); Kai-Wei Chen, Taoyuan (TW); Shang-I Wong, Taoyuan (TW); Chia-Lun Ku, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/708,117

(22) Filed: Sep. 18, 2017

(65) Prior Publication Data

US 2018/0088774 A1 Mar. 29, 2018

Related U.S. Application Data

(60) Provisional application No. 62/399,505, filed on Sep. 26, 2016.

(51) Int. Cl.
*G06F 3/0481* (2013.01)
*G06Q 30/06* (2012.01)
(Continued)

(52) U.S. Cl.
CPC ....... *G06F 3/04815* (2013.01); *G02B 27/017* (2013.01); *G06F 3/0482* (2013.01);
(Continued)

(58) Field of Classification Search
CPC .. G06K 9/00664–00704; G06F 3/0481; G06F 3/04817; G06F 9/4443;
(Continued)

(56) References Cited

U.S. PATENT DOCUMENTS

2007/0072675 A1* 3/2007 Hamano ................ A63F 13/10
463/42
2014/0002444 A1* 1/2014 Bennett .................. G06F 3/012
345/419
(Continued)

FOREIGN PATENT DOCUMENTS

EP 3062280 A1 8/2016

OTHER PUBLICATIONS

Henry; Henry; Apr. 23, 2016; https://www.youtube.com/watch?v=BDano_gY3x0, My "Glory of the King" film.*
(Continued)

*Primary Examiner* — Todd Buttram
(74) *Attorney, Agent, or Firm* — Winston Hsu

(57) ABSTRACT

A method for providing demonstration information in a simulation environment and associated simulation system are provided. The method includes: controlling a head mounted display (HMD) device of the simulation system to present the simulation environment and allow a user of the simulation system to see the simulation environment when wearing the HMD device on the user's head; controlling the HMD device to display a first controller in the simulation environment, to allow the user to interact with the simulation environment; controlling the HMD device to display a menu including a plurality of items, to allow the user to select an item of the plurality of items with aid of the first controller; and controlling the HMD device to display a predetermined space associated to a product corresponding to the item, wherein the predetermined space is different from default space of the simulation environment, and includes demonstration information of the product.

20 Claims, 13 Drawing Sheets

(51) Int. Cl.
*G06F 3/0482* (2013.01)
*G06T 19/00* (2011.01)
*G02B 27/01* (2006.01)
*G06F 3/01* (2006.01)

(52) U.S. Cl.
CPC ....... *G06Q 30/0643* (2013.01); *G06T 19/006* (2013.01); *G02B 2027/014* (2013.01); *G02B 2027/0187* (2013.01); *G06F 3/011* (2013.01)

(58) Field of Classification Search
CPC .. G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
USPC .......................................................... 345/419
See application file for complete search history.

(56) References Cited

U.S. PATENT DOCUMENTS

| | | | |
|---|---|---|---|
| 2015/0309705 A1* | 10/2015 | Keeler | G06N 7/005 705/27.2 |
| 2016/0171770 A1 | 6/2016 | Pedrotti | |
| 2016/0240006 A1* | 8/2016 | Ur | G06T 11/00 |
| 2016/0260251 A1* | 9/2016 | Stafford | G06T 19/006 |
| 2016/0300392 A1* | 10/2016 | Jonczyk | G06T 19/003 |
| 2017/0092235 A1* | 3/2017 | Osman | G06F 3/012 |
| 2017/0109936 A1* | 4/2017 | Powderly | G06F 3/012 |
| 2017/0148225 A1* | 5/2017 | Hsu | G06T 19/20 |
| 2018/0045963 A1* | 2/2018 | Hoover | G06F 3/011 |
| 2018/0122143 A1* | 5/2018 | Ellwood, Jr. | G06T 19/006 |

OTHER PUBLICATIONS

Search Report dated Dec. 14, 2017 for EP application No. 17192904. 5, pp. 1-8.
Henry henry et al., Videos 'My Strike of Kings Video' and 'Typo Strike of Kings Arthur Strong 29 Kill with Top Score Unstoppable', respectively published on YOUTUBE website with web address of https://www.youtube.com/watch?v=BDano_gY3x0 on Apr. 23, 2016 and bilibili channel with web address of https://www.bilibili.com/video/av4867021/ on Jun. 5, 2016.
Office action dated May 6, 2019 for the Taiwan application No. 106132260, filed Sep. 20, 2017, pp. 1-13.

* cited by examiner

METHOD FOR PROVIDING DEMONSTRATION INFORMATION IN SIMULATION ENVIRONMENT, AND ASSOCIATED SIMULATION SYSTEM

CROSS REFERENCE TO RELATED APPLICATIONS

This application claims the benefit of U.S. Provisional Application No. 62/399,505, which was filed on Sep. 26, 2016, and is incorporated herein by reference.

BACKGROUND OF THE INVENTION

1. Field of the Invention

The present invention relates to a head mounted display (HMD), and more particularly, to a method for providing demonstration information in a simulation environment, and an associated simulation system.

2. Description of the Prior Art

An HMD is typically implemented as a display device that a user may wear on his/her head in order to have video information directly displayed in front of the eyes. For example, the HMD may have either one or two small LCD or OLED displays and associated optical system(s) (e.g. one or more magnifying lenses and other optical elements), and the displays and the associated optical system(s) are typically embedded in a wearable device such as a helmet, glasses, etc. When the user wears this wearable device, the optical system(s) allow the user to have the perception that the images are coming from a greater distance, so eyestrain may be prevented. In some examples, the HMD may be implemented with a single display, and an image may be projected through an optical system that splits the image into two identical images and redirects the two images to the eyes, respectively. In some examples, the HMD may be implemented with two displays, in order to show stereoscopic images, where images of the same object with slightly different angles may be viewed together to create an impression of depth and solidity.

When the user is wearing the HMD and trying to find something to purchase (e.g. an application (or App) such as a new game, etc.) in a virtual reality (VR) world presented by the HMD, the user may have no idea about a product on a menu. For example, there may be some texts related to the product, and perhaps a picture of the product. The user may be not sure whether he/she likes it or not. In addition, the user may be forced to take off the HMD and leave the VR world, in order to make a phone call for more information. Although the user may go back to the VR world again after making the phone call, the pleasure of immersing himself/herself in the VR world is interrupted. Thus, a novel method and associated architecture are required for enhancing user experience.

SUMMARY OF THE INVENTION

It is therefore an objective of the claimed invention to provide a method for providing demonstration information in a simulation environment, and an associated simulation system, in order to solve the above-mentioned problems.

It is another objective of the claimed invention to provide a method for providing demonstration information in a simulation environment, and an associated simulation system, in order to enhance user experience.

According to at least one embodiment, a method for providing demonstration information in a simulation environment is provided, where the method is applicable to a simulation system. For example, the simulation system may be one of a virtual reality (VR) system, an augmented reality (AR) system, and a mixed reality (MR) system. The method may comprise: controlling a head mounted display (HMD) device of the simulation system to present the simulation environment and allow a user of the simulation system to see the simulation environment when wearing the HMD device on the user's head; controlling the HMD device to display a first controller in the simulation environment, to allow the user to interact with the simulation environment; controlling the HMD device to display a menu comprising a plurality of items, to allow the user to select an item of the plurality of items with aid of the first controller; and controlling the HMD device to display a predetermined space associated to a product corresponding to the item, wherein the predetermined space is different from default space of the simulation environment, and the predetermined space comprises demonstration information of the product. For example, the predetermined space associated to the product and the menu of the simulation environment may be displayed at the same time.

According to at least one embodiment, a simulation system for providing demonstration information in a simulation environment is provided, where the simulation system may be one of a VR system, an AR system, and an MR system. The simulation system may comprise an HMD device and a processing circuit that is coupled to the HMD device. The HMD device is configured to present the simulation environment and allow a user of the simulation system to see the simulation environment when wearing the HMD device on the user's head. In addition, the processing circuit is configured to perform information processing for the HMD device. For example, the processing circuit may control the HMD device to perform the following operations: displaying a first controller in the simulation environment to allow the user to interact with the simulation environment; displaying a menu comprising a plurality of items, to allow the user to select an item of the plurality of items with aid of the first controller; and displaying a predetermined space associated to a product corresponding to the item, wherein the predetermined space is different from default space of the simulation environment, and the predetermined space comprises demonstration information of the product. For example, the predetermined space associated to the product and the menu of the simulation environment may be displayed at the same time.

The method and the associated simulation system may solve problems existing in the related arts without introducing unwanted side effects, or in a way that is less likely to introduce a side effect. For example, when the user is wearing the HMD device and is trying to find something to purchase (e.g. an application (or App) such as a new game, etc.) in the simulation environment (e.g. a VR environment, an AR environment, or an MR environment) presented by the HMD device, the user may preview and explore assets and/or interact with assets regarding a product, to easily make his/her decision (e.g. purchase) in the simulation environment without taking off the HMD device, and therefore the pleasure of immersing himself/herself in the simulation environment will not be interrupted.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
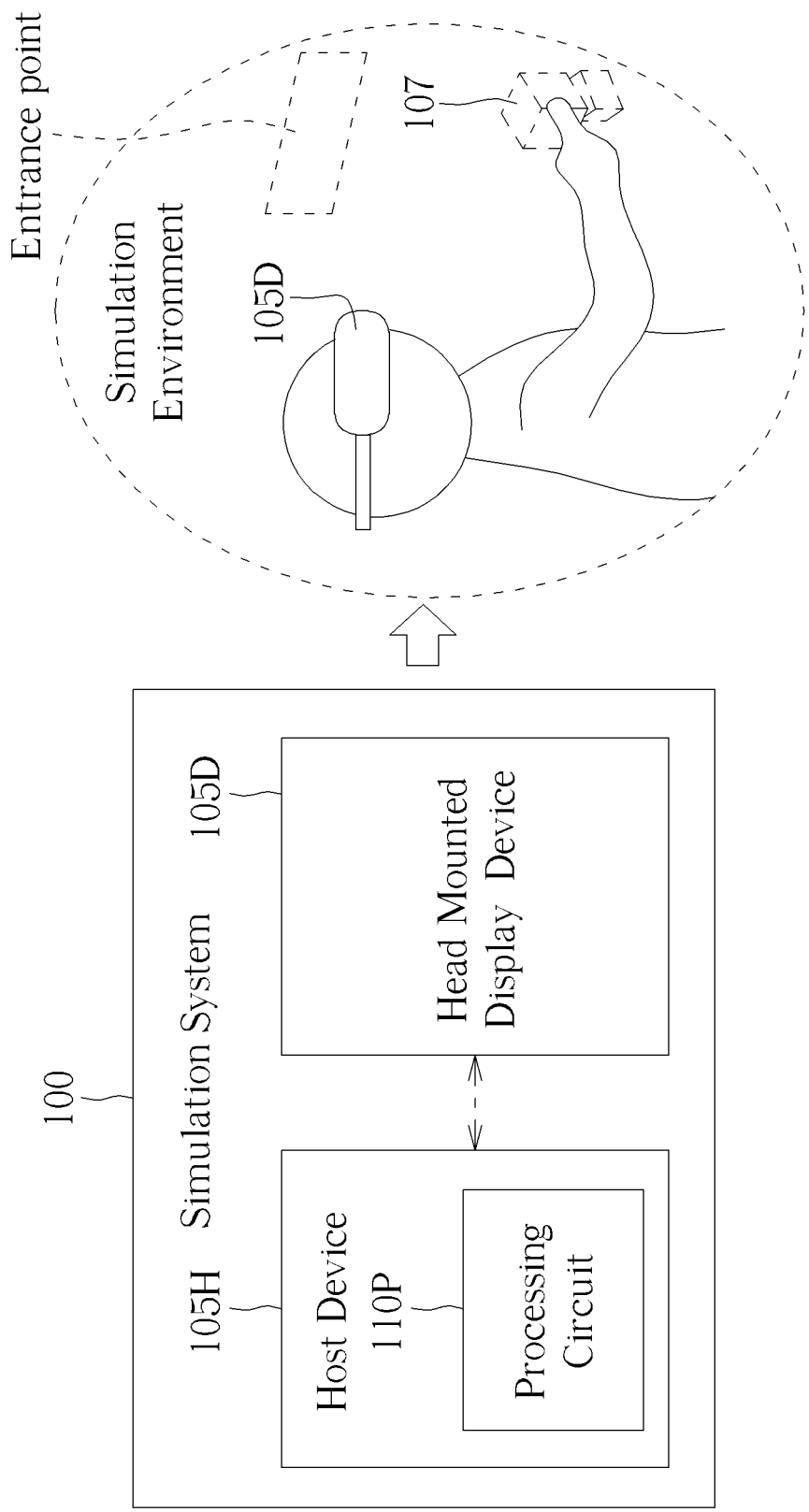
FIG. 1 is a diagram of a simulation system according to an embodiment of the present application.

FIG. 1 is a diagram of a simulation system 100 according to an embodiment of the present application, where the simulation system 100 may be configured to provide demonstration information in a simulation environment. For example, the simulation system 100 may be implemented as a virtual reality (VR) system, an augmented reality (AR) system, or a mixed reality (MR) system. As shown in FIG. 1, the simulation system 100 may comprise a host device 105H and a head mounted display (HMD) device 105D, and the host device 105H may comprise a processing circuit 110P. According to this embodiment, the host device 105H and the HMD device 105D are individual devices, and the processing circuit 110P of the host device 105H and the HMD device 105D may be coupled to each other through one or more wired connections or one or more wireless connections. Examples of the host device 105H may include, but not limited to, personal computers (PCs) (e.g. desktop computers and laptop computers), multifunctional mobile phones, and tablets.

The processing circuit 110P may control operations of the host device 105H, and the host device 105H (more particularly, the processing circuit 110P therein) may control operations of the HMD device 105D to interact with a user of the simulation system 100 when the user wears the HMD device 105D on his/her head. In addition, the HMD device 105D may be configured to present the simulation environment, such as a VR environment, an AR environment, or an MR environment. Under control of the processing circuit 110P, the HMD device 105D may present the simulation environment and allow the user of the simulation system to see the simulation environment (e.g. the VR environment, the AR environment, or the MR environment) when wearing the HMD device 105D on the user's head. As a result, the user wearing the HMD device 105D may see one or more virtual objects of the simulation environment, such as the virtual objects 107 viewed by the user. According to some embodiments, the designs of the HMD device 105D shown in the right half of FIG. 1 (e.g. the size, the shape and/or the style thereof) may vary. According to some embodiments, the designs of the virtual objects 107 shown in the right half of FIG. 1 (e.g. the size and/or the shape thereof) may vary.

According to the embodiment shown in FIG. 1, the processing circuit 110P may be configured to perform information processing for the HMD device 105D. For example, the processing circuit 110P may control the HMD device 105D to display one or more controllers in the simulation environment, such as two controllers (e.g. two virtual objects) in the simulation environment that correspond to two physical controllers to be held by two hands of the user, respectively, for allowing the user to interact with the simulation environment. The two virtual objects may be designed to be two virtual controllers respectively corresponding to the two physical controllers of the simulation system 100. The user may hold the physical controllers in the real space while virtually holding the two controllers (e.g. the two virtual objects) in the simulation environment. When needed, the user may move the physical controllers in the real space while virtually moving the two controllers in the simulation environment, and may press physical buttons on the physical controllers in the real space while virtually doing something in the simulation environment. This allows a person such as the user to spend his/her time on playing games, shopping, etc. in the simulation environment and immerse himself/herself in the simulation environment. Additionally, the processing circuit 110P may control the HMD device 105D to display one or more entrance points in the simulation environment, to allow the user to trigger one or more services related to purchasing commercial products (e.g. applications (or Apps) such as games, etc.) in the simulation environment. For example, when the user is wearing the HMD device 105D and is trying to find something to purchase (e.g. one of the Apps, such as a new game, etc.) in the simulation environment (e.g. the VR environment, the AR environment, or the MR environment) presented by the HMD device 105D, the user may preview and explore assets and/or interact with assets regarding a product such as one of the commercial products, to easily make his/her decision (e.g. purchase) in the simulation environment without taking off the HMD device 105D, and therefore the pleasure of immersing himself/herself in the simulation environment will not be interrupted.

Figure 2:
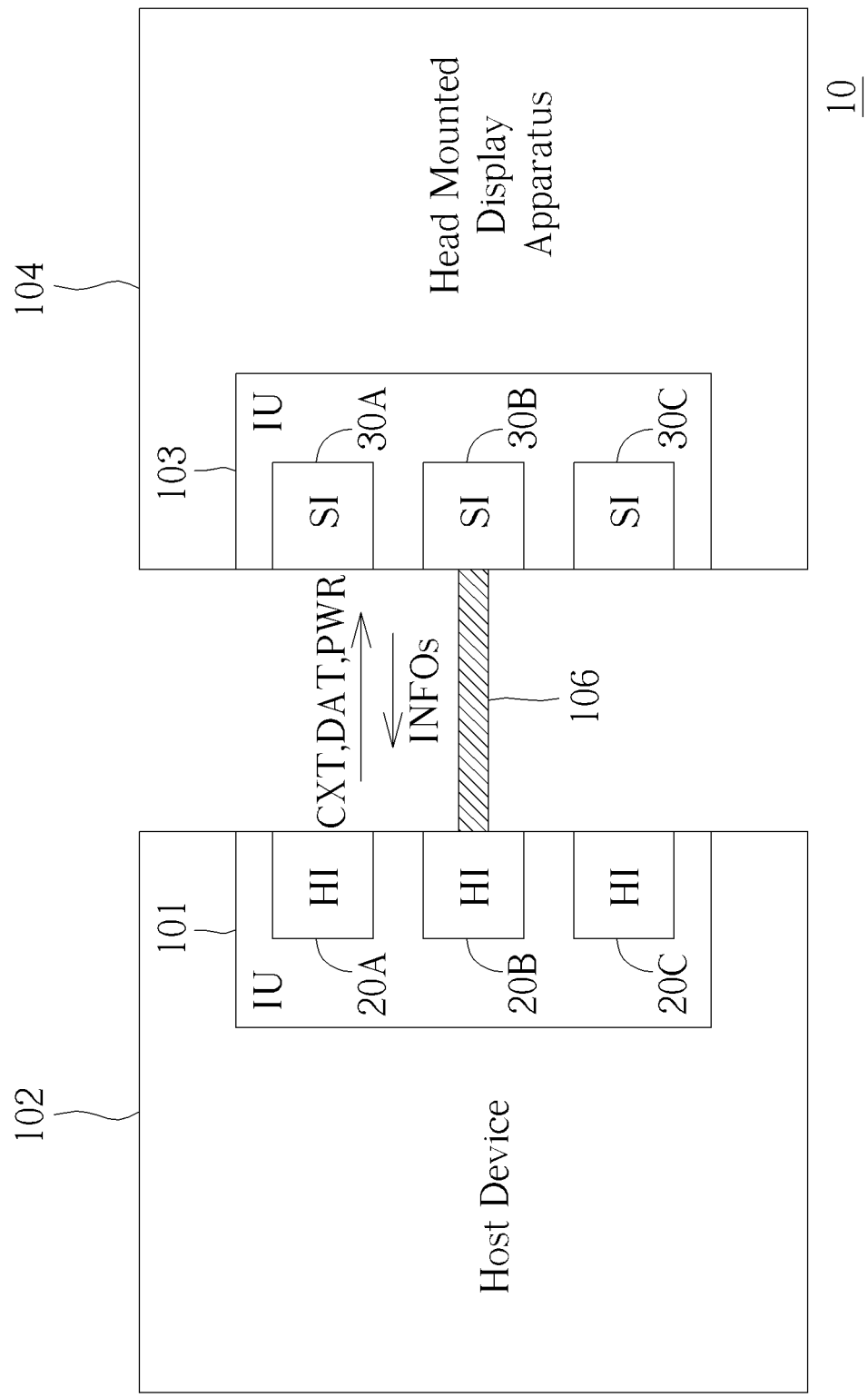
FIG. 2 illustrates a virtual reality (VR) system according to an embodiment of the present application, where the VR system shown in FIG. 2 can be taken as an example of the simulation system shown in FIG. 1.

FIG. 2 illustrates a VR system 10 according to an embodiment of the present application, where the VR system 10 shown in FIG. 2 can be taken as an example of the simulation system 100 shown in FIG. 1. The VR system 10 comprises a host device 102, a head mounted display (HMD) apparatus 104 to be worn by the user, and a transmission cable 106 (optional) connected between an interface unit (IU) 101 of the host device 102 and an interface unit (IU) 103 of the HMD apparatus 104. In the VR system 10, the host device 102 can be taken as an example of the host device 105H shown in FIG. 1, a processing circuit (e.g. one or more processors) within the host device 102 can be taken as an example of the processing circuit 110P shown in FIG. 1, and the HMD apparatus 104 can be taken as an example of the HMD device 105D shown in FIG. 1. The interface unit 101 of the host device 102 comprises a first host interface 20A for providing a multimedia content CXT to the HMD apparatus 104, a second host interface 20B for providing communication data DAT to the HMD apparatus 104, and a third host interface 20C for providing a power voltage PWR to power the HMD apparatus 104, where each of the first host interface 20A, the second host interface 20B, and the third host interface 20C may be labeled "HI" (which stands for "host interface") in FIG. 2, for brevity. Furthermore, the interface unit 103 of the HMD apparatus 104 has a first slave interface 30A capable of being coupled to the first host interface 20A via the transmission cable 106, a second slave interface 30B capable of being coupled to the second host interface 20B via the transmission cable 106, and a third slave interface 30C capable of being coupled to the third host interface 20C via the transmission cable 106, where each of the first slave interface 30A, the second slave interface 30B, and the third slave interface 30C may be labeled "SI" (which stands for "slave interface") in FIG. 2, for brevity. The HMD apparatus 104 is capable of playing the multimedia content CXT from the host device 102, and sensing information $INFO_s$ regarding the HMD apparatus 104 and/or the user. Based on the information sensed by the HMD apparatus 104, the host device 102 can timely modulate the multimedia content CXT. In one embodiment, the host device 102 is capable of processing a multimedia source and generating the multimedia content CXT according to the multimedia source and the information sensed by the HMD apparatus 104.

According to some embodiments, the host device 102 may comprise a computing device for generating the multimedia content CXT. The computing device may be a PC (e.g. a desktop computer or a laptop computer), or a smart phone or any other portable device with a powerful processor inside. The computing device can receive a multimedia source from a storage unit or Internet network, and the computing device is capable of generating the multimedia content CXT according to the multimedia source and the sensing information $INFO_s$ from the HMD apparatus 104. The computing device is also capable of generating the communication data according to the sensing information $INFO_s$. The host device 102 may further comprise a connection control unit coupled between the computing device and the transmission cable 106 shown in FIG. 2, wherein the connection control unit is capable of enhancing the signal strength of the communication data DAT and/or the sensing information $INFO_s$ communicated between the computing device and the connection control unit. Furthermore, the connection control unit can connect to a power source, so that the connection control unit is capable of transmitting the power voltage PWR to a power path of the transmission cable 106. In one embodiment, the connection control unit comprises a switch, which is used to control the supply of the multimedia content CXT, the communication data DAT, and/or the power voltage PWR to the transmission cable 106. Regarding some implementation details of the VR system 10 shown in FIG. 2, please refer to U.S. Patent Application Publication No. US 2016/0162012 A1 (filed on Nov. 12, 2015) and U.S. Patent Application Publication No. US 2016/0163110 A1 (filed on Nov. 17, 2015), which are incorporated herein by reference.

Figure 3:
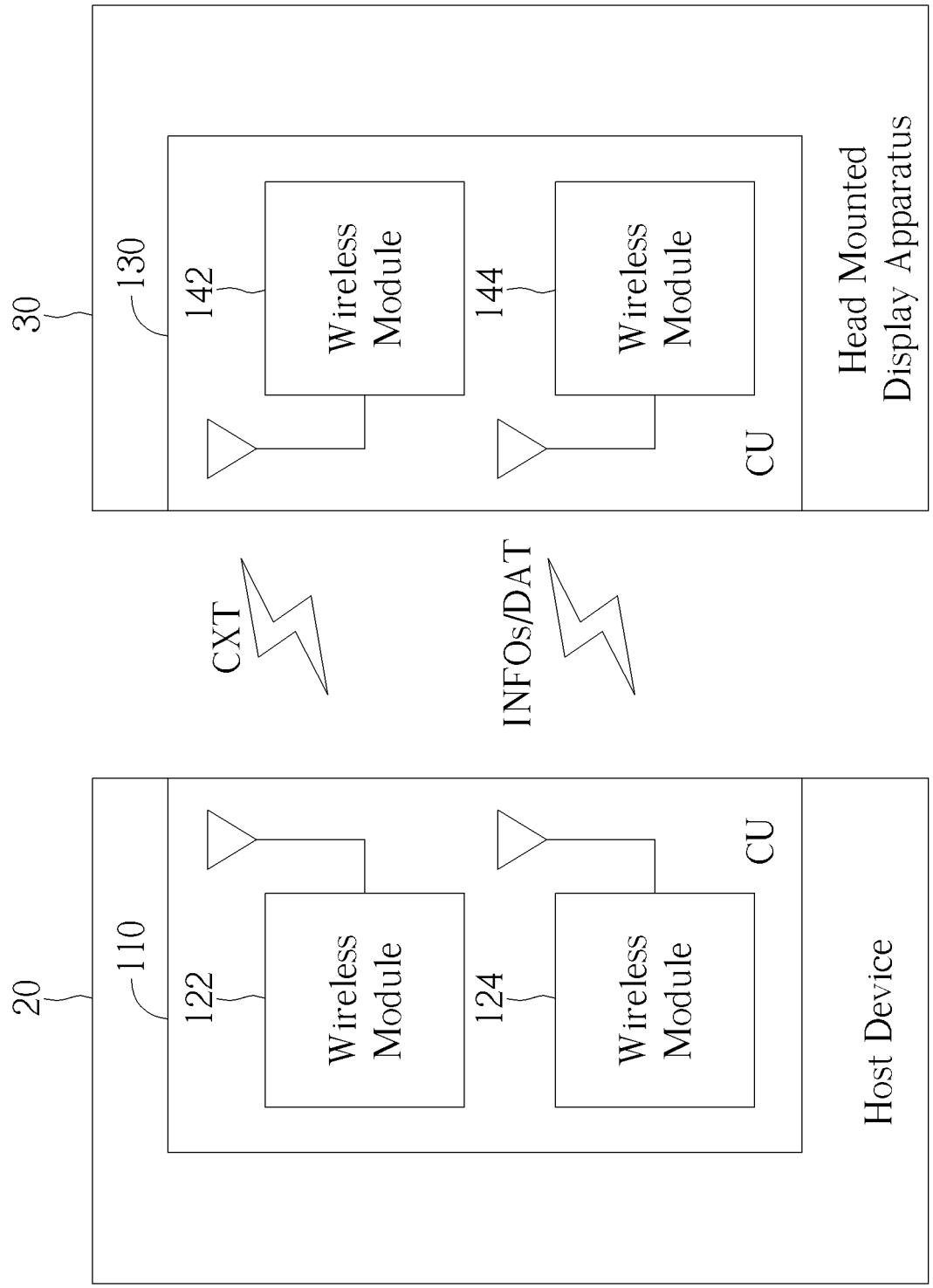
FIG. 3 illustrates a VR system according to another embodiment of the present application, where the VR system shown in FIG. 3 can be taken as an example of the simulation system shown in FIG. 1.

FIG. 3 illustrates a VR system according to another embodiment of the present application, where the VR system shown in FIG. 3 can be taken as an example of the simulation system 100 shown in FIG. 1. The VR system shown in FIG. 3 comprises a host device 20 and a head mounted display (HMD) apparatus 30 to be worn by the user. In this VR system, the host device 20 can be taken as an example of the host device 105H shown in FIG. 1, a processing circuit (e.g. one or more processors) within the host device 20 can be taken as an example of the processing circuit 110P shown in FIG. 1, and the HMD apparatus 30 can be taken as an example of the HMD device 105D shown in FIG. 1. A communication unit (CU) 110 of the host device 20 comprises a wireless module 122 for providing a multimedia content such as the multimedia content CXT mentioned above to the HMD apparatus 30, and a wireless module 124 for providing communication data such as the communication data DAT mentioned above to the HMD apparatus 30. The HMD apparatus 30 is capable of playing the multimedia content CXT from the host device 20, and obtaining the sensing information $INFO_s$ regarding the HMD apparatus 30 and/or the user wearing the HMD apparatus 30. A communication unit (CU) 130 of the HMD apparatus 30 comprises a wireless module 142 for receiving the multimedia content CXT from the host device 20, and a wireless module 144 for receiving the communication data DAT from the host device 20 and providing the sensing information $INFO_s$ to the host device 20. Based on the information sensed by the HMD apparatus 30, the host device 20 can timely modulate the multimedia content CXT. In one embodiment, the host device 20 is capable of processing a multimedia source and generating the multimedia content CXT according to the multimedia source and the information sensed by the HMD apparatus 30. It should be noted that the wireless module 122 of the host device 20 and the wireless module 142 of the HMD apparatus 30 support the same wireless technology (e.g. Bluetooth, Wi-Fi, etc.), and the wireless module 124 of the host device 20 and the wireless module 144 of the HMD apparatus 30 support the same wireless technology (e.g. Bluetooth, Wi-Fi, etc.).

According to some embodiments, the host device 20 may further comprise a computing device for generating the multimedia content CXT. The host device 20 may be a PC (e.g. a desktop computer or a laptop computer), a tablet PC, a smartphone, or any other portable device with a powerful processor inside. The computing device can receive a multimedia source from a storage unit or Internet network, and the computing device is capable of generating the multimedia content CXT according to the multimedia source and the sensing information $INFO_s$ from the HMD apparatus 30. The computing device is also capable of generating the communication data DAT according to the sensing information $INFO_s$. Regarding some implementation details of the VR system shown in FIG. 3, please refer to U.S. Patent Application Publication No. US 2016/0163283 A1 (filed on Nov. 24, 2015), which is incorporated herein by reference.

Figure 4:
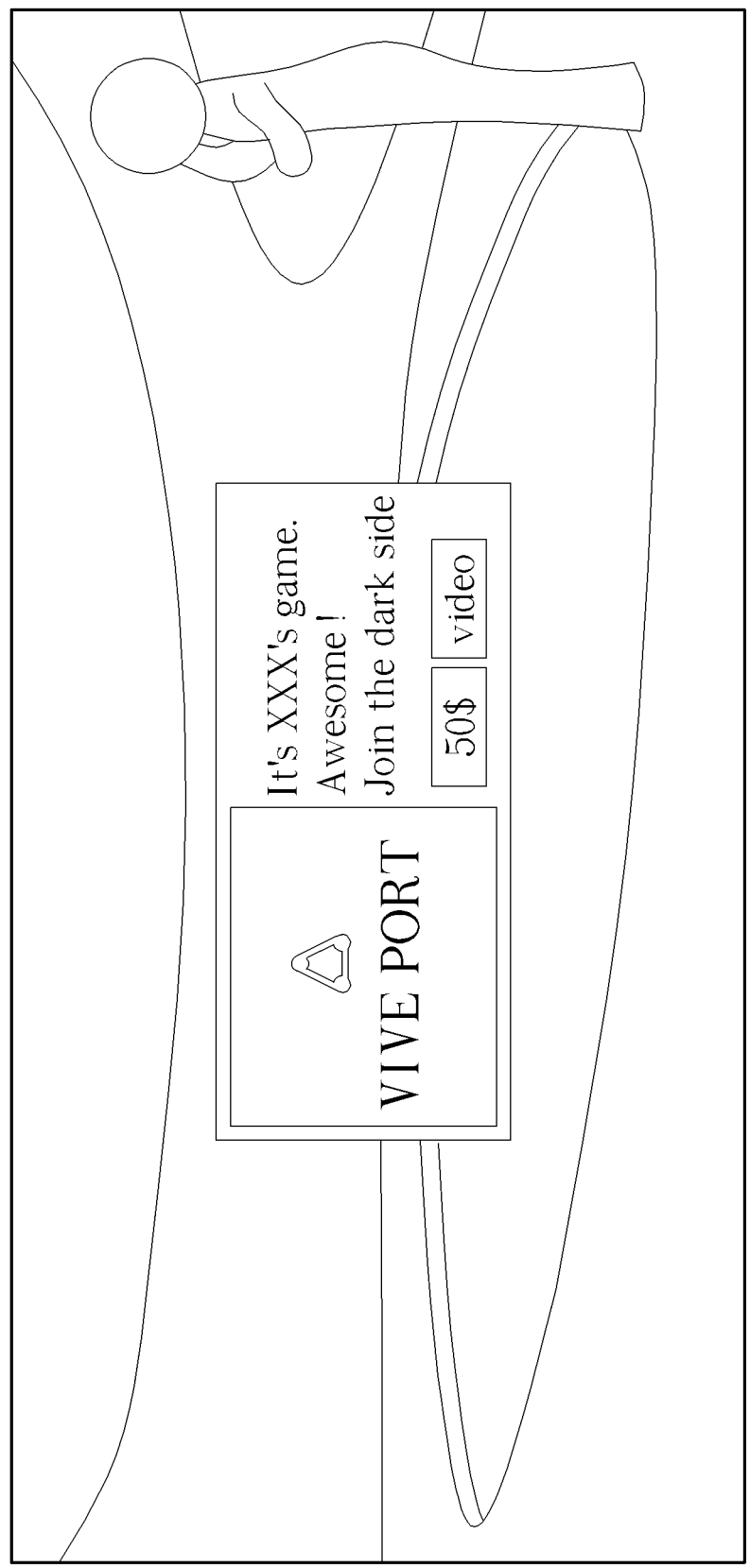
FIG. 4 illustrates a preview control scheme applied to the simulation system shown in FIG. 1 according to an embodiment of the present application.

FIG. 4 illustrates a preview control scheme applied to the simulation system 100 shown in FIG. 1 according to an embodiment of the present application. The processing circuit 110P may control the HMD device 105D to display an entrance video object as an entrance point, such as that in front of the user in the simulation environment. The user may stand in the real space while virtually standing in the simulation environment, where the video object illustrated at the center of the simulation environment shown in FIG. 4, having a logo indicating the service (e.g. the picture with its name "VIVEPORT") and a message related to the product to be purchased in the service (e.g. the text message "It's XXX's game. Awesome! Join the dark side" next to this picture), can be taken as an example of the entrance video object corresponding to the entrance point, but the present invention is not limited thereto. According to this embodiment, the entrance video object may comprise a virtual button for purchasing the product through the entrance point, such as that labeled the price of the product (e.g. the virtual button labeled "50$"), and may further comprise another virtual button for normal preview, such as that corresponding to a video clip, trailer, etc. (e.g. the virtual button labeled "video").

The user may use one of the two controller (e.g. the two virtual objects) in the simulation environment that correspond to the two physical controllers, such as the controller corresponding to the physical controller in his/her right hand, to point to the virtual button labeled the price of the product (e.g. "50$") (and more particularly, press a button of the physical controller at the same time) to enter the entrance point, for purchasing the product (e.g. an application (or App) such as a new game, etc.) with 50 dollars, for example. Before entering the entrance point to purchase the product, the user may user the controller corresponding to the physical controller in his/her right hand to point to the virtual button of "video" (and more particularly, press the button of the physical controller at the same time) to view a video clip related to the product, for purpose of preview. According to this embodiment, the processing circuit 110P may load the default space of the simulation environment, and the processing circuit 110P may control the HMD device 105D to display the default space by default, where the default space is not associated to the product, but the present invention is not limited thereto. According to some embodiments, the default space may correspond to the service. According to some embodiments, the user may interact with the simulation system 100 by using the controller corresponding to the physical controller in his/her left hand.

Figure 5:
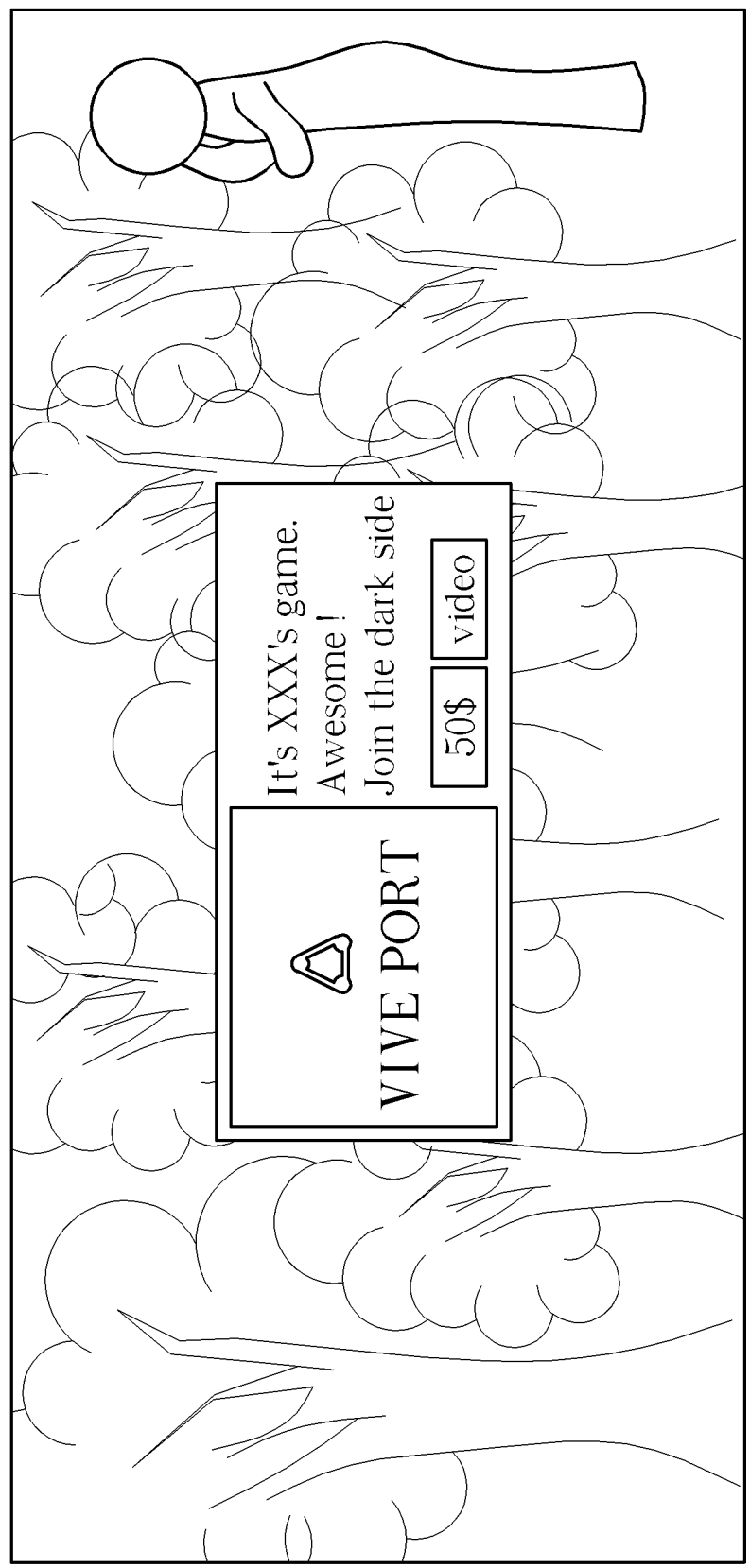
FIG. 5 illustrates a presentation replacement configuration of the preview control scheme shown in FIG. 4 according to an embodiment of the present application.

FIG. 5 illustrates a presentation replacement configuration of the preview control scheme shown in FIG. 4 according to an embodiment of the present application. The processing circuit 110P may control the HMD device 105D to display a predetermined space associated to the product, to replace the default space with the predetermined space, where the predetermined space is typically different from the default space of the simulation environment, and the predetermined space may comprise demonstration information of the product. For example, the product may be an App such as a new game, and the predetermined space associated to the product may comprise a scene in the product (e.g. the game). Preferably, the predetermined space associated to the product may comprise various video objects, the associated surrounding, background, etc. in the simulation environment, as if the user has purchased the product and owns the product. As a result of displaying the predetermined space associated to the product, the simulation system 100 allows the user to try at least one portion of the product in advance, before the user purchases the product.

According to this embodiment, the VR space in the simulation environment shown in FIG. 5, including all the background video objects (e.g. trees, etc.) behind the entrance video object, can be taken as an example of the predetermined space associated to the product, but the present invention is not limited thereto. According to some embodiments, the predetermined space associated to the product may vary.

Figure 6:
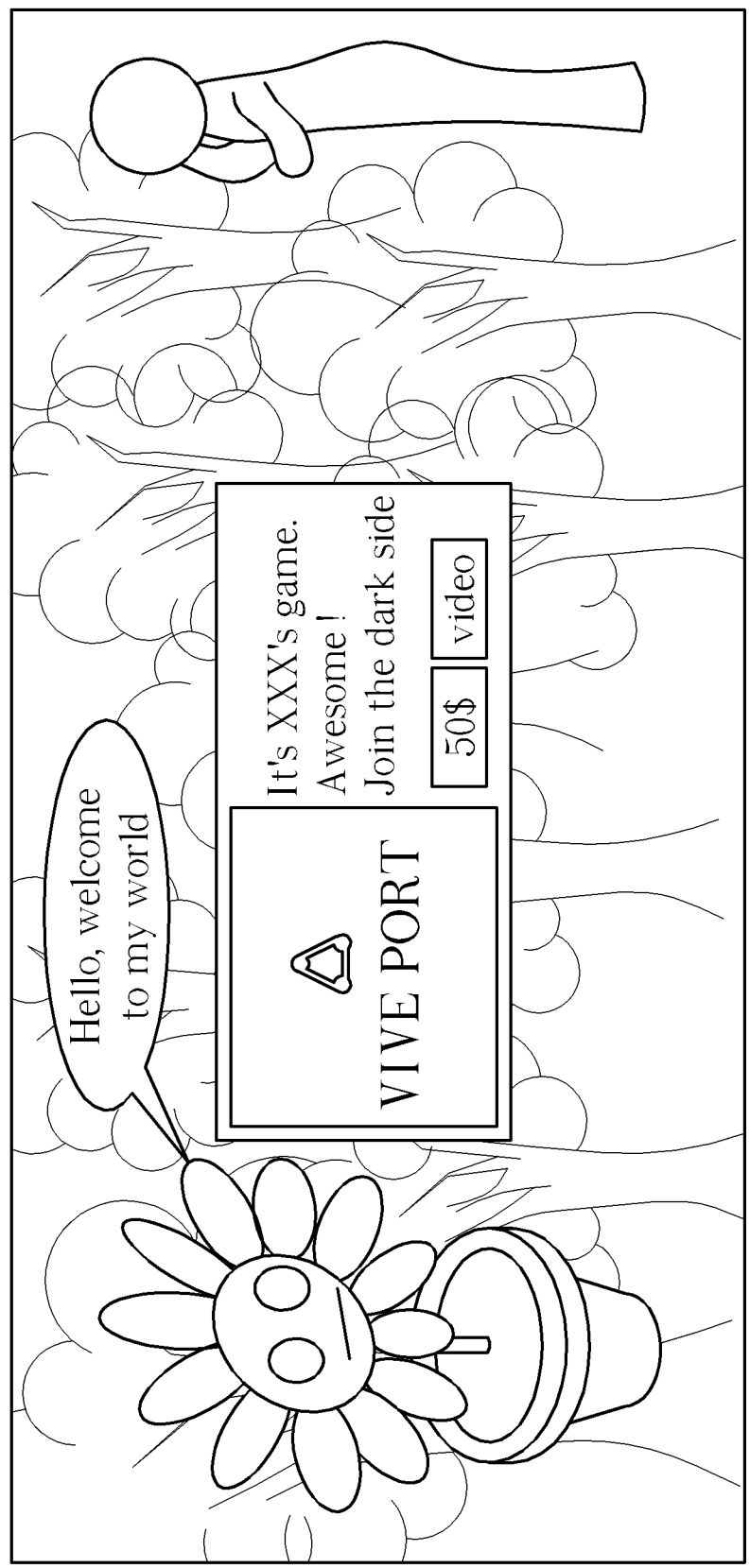
FIG. 6 illustrates an interaction configuration of the preview control scheme shown in FIG. 4 according to an embodiment of the present application.

FIG. 6 illustrates an interaction configuration of the preview control scheme shown in FIG. 4 according to an embodiment of the present application. The processing circuit 110P may control the HMD device 105D to display the predetermined space associated to the product, to replace the default space with the predetermined space. In addition, the processing circuit 110P may control the HMD device 105D to display at least one predetermined video object (e.g. one or more predetermined video objects) associated to the product, to allow the user to interact with the aforementioned at least one predetermined video object associated to the product. For example, the product may be an application (App) such as a new game, and the aforementioned at least one predetermined video object associated to the product may comprise a virtual character model of the product (e.g. a virtual creature, etc. of the game). As a result of displaying the predetermined video object associated to the product, for the user to interact with, the simulation system 100 allows the user to try at least one portion of the product in advance, before the user purchases the product.

According to this embodiment, the virtual plant in the simulation environment shown in FIG. 5, including a flower with a face and capable of saying something to the user (e.g. the message "Hello, welcome to my world!!", which may be output as at least one of an audio message and a video message), can be taken as an example of the virtual character model of the product, but the present invention is not limited thereto. According to some embodiments, the virtual character model of the product may vary. According to some embodiments, the aforementioned at least one predetermined video object associated to the product may vary.

Based on the presentation replacement configuration and/or the interaction configuration of the preview control scheme, the present invention can solve problems existing in the related arts without introducing unwanted side effects, or in a way that is less likely to introduce a side effect.

Figure 7:
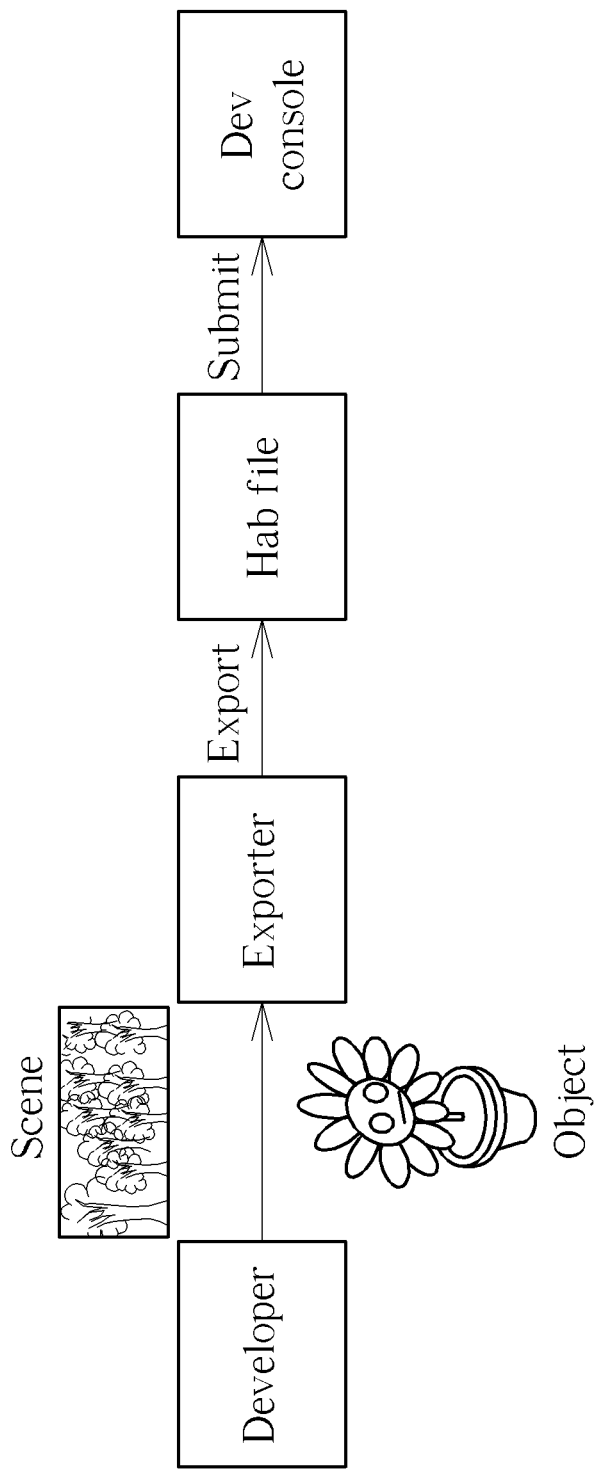
FIG. 7 illustrates a workflow of preparing associated information for the preview control scheme shown in FIG. 4 according to an embodiment of the present application.

FIG. 7 illustrates a workflow of preparing associated information for the preview control scheme shown in FIG. 4 according to an embodiment of the present application. The developer of the product may take a set of one or more scenes and a set of one or more objects from the product, and provide the simulation system 100 with the associated information through the workflow. The exporter (e.g. a program module running on a computer) may be arranged to export the set of one or more scenes and the set of one or more objects from the product to generate one or more Hab files, and may further submit them to a device (Dev) console such as a server providing the service mentioned above. For example, the server may be provided by the manufacturer of the simulation system 100, but the present invention is not limited thereto.

Figure 8:
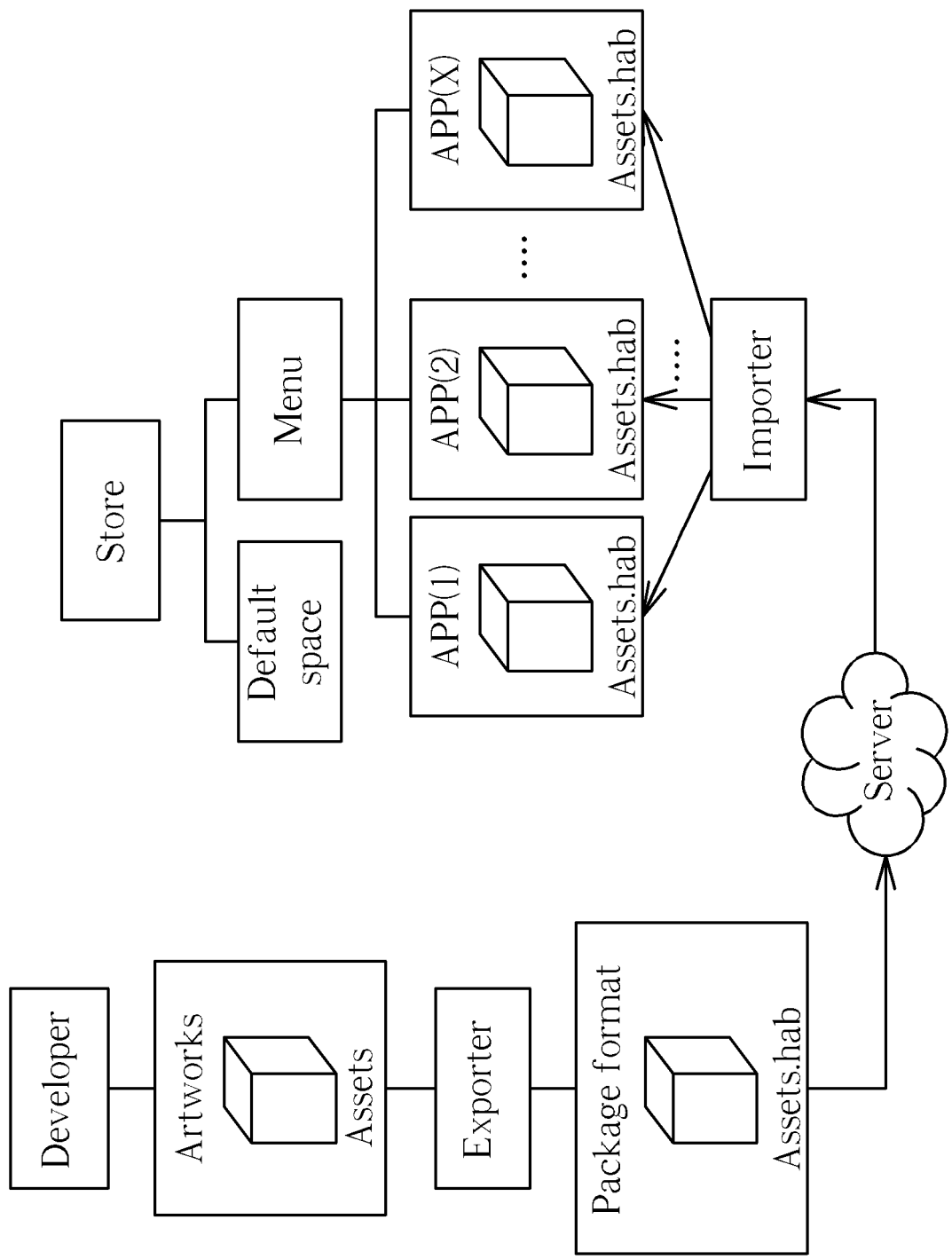
FIG. 8 illustrates some implementation details of the preview control scheme shown in FIG. 4 according to an embodiment of the present application.

FIG. 8 illustrates some implementation details of the preview control scheme shown in FIG. 4 according to an embodiment of the present application. The artworks of the product may comprise a set of one or more assets, and the set of one or more assets may comprise at least one (e.g. one or both) of the set of one or more scenes and the set of one or more objects. The package format may be implemented with that of the Hab files. For better comprehension, the filename "Assets.hab" in the package format may represent the aforementioned one or more Hab files. The simulation system 100 may be equipped with the importer (e.g. a program module running on the processing circuit 110P), but the present invention is not limited thereto. The importer may import Hab files of various products, such as that of a plurality of Apps {APP(1), APP(2), . . . , APP(X)}, where X may represent the number of the Apps. For better comprehension, the filename "Assets.hab" in the Apps {APP(1), APP(2), . . . , APP(X)} may represent the Hab files thereof, respectively. The store can be taken as an example of the service and/or the platform for providing the service, where the menu may comprise items corresponding to the products in the store, respectively, but the present invention is not limited thereto. For example, the processing circuit 110P may control the HMD device 105D to list the names of the products (e.g. the names of the Apps {APP(1), APP(2), . . . , APP(X)}) in the menu.

Figure 9:
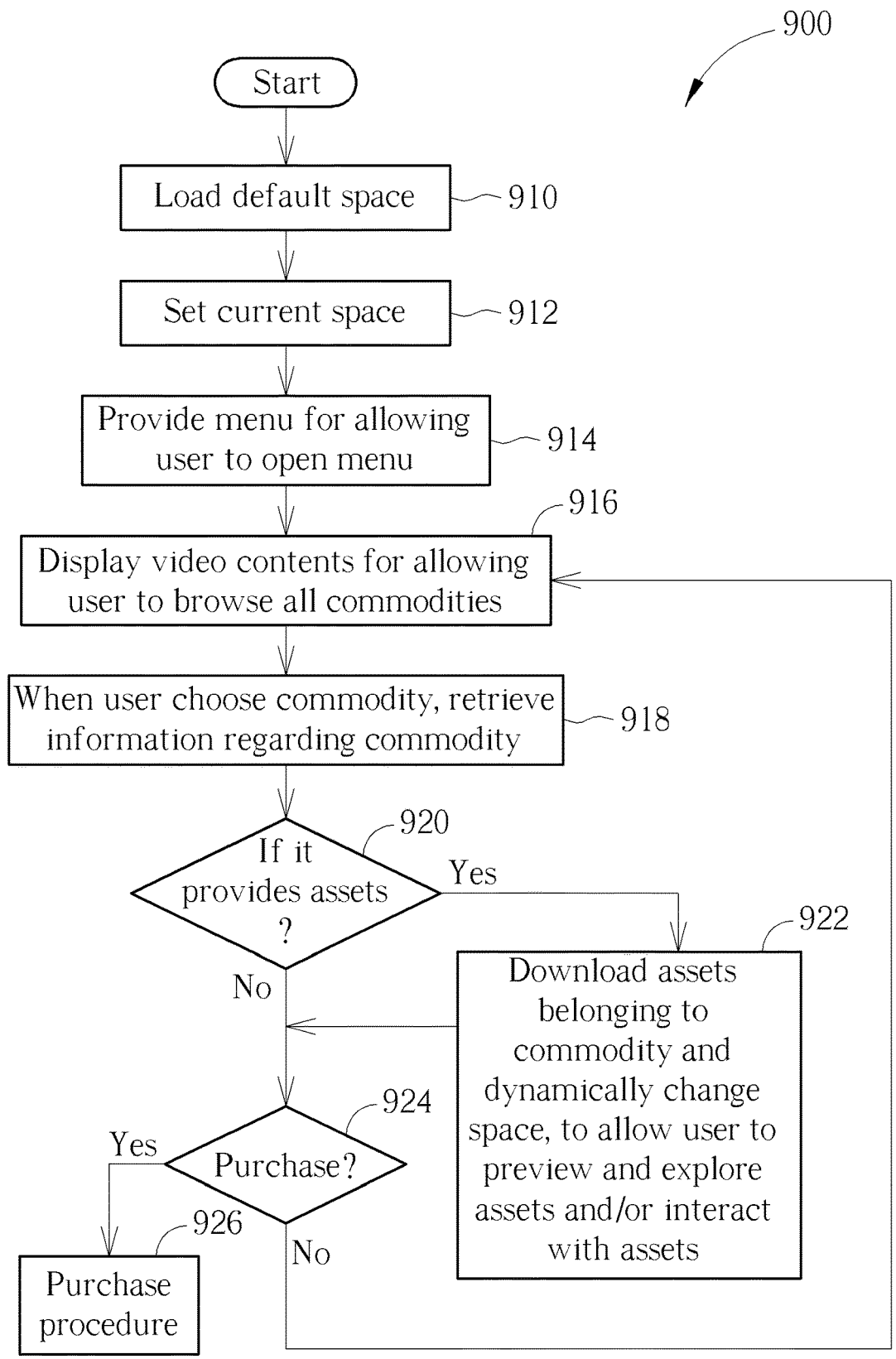
FIG. 9 is a flowchart of a method for providing demonstration information in a simulation environment according to an embodiment of the present application.

FIG. 9 is a flowchart of a method 900 for providing demonstration information in a simulation environment according to an embodiment of the present application. The method 900 can be applied to the simulation system 100 shown in FIG. 1, and can be applied to the host device 105H (more particularly, the processing circuit 110P) and the HMD device 105D. For example, the processing circuit 110P controls the HMD device 105D to present the simulation environment and allow the user of the simulation system 100 to see the simulation environment when wearing the HMD device 105D on the user's head. The processing circuit 110P may control the HMD device 105D to display the aforementioned one or more controllers in the simulation environment, such as the two controllers (e.g. the two virtual objects) in the simulation environment that correspond to the two physical controllers to be held by the two hands of the user, respectively, to allow the user to interact with the simulation environment, but the present invention is not limited thereto.

In Step 910, the processing circuit 110P loads the default space of the simulation environment. For example, the processing circuit 110P may control the HMD device 105D to display the default space by default, where the default space is not associated to any of the products for being purchased in the service. The user may virtually stand (and more particularly, holding the controller corresponding to the physical controller in his/her right hand at the same time, for example) in the default space to start exploring the store.

In Step 912, the processing circuit 110P sets the current space, such as an updated version of the default space. For example, when the user starts using the service, the processing circuit 110P may retrieve information of one or more additional video objects to update the default space, and therefore the updated version of the default space may correspond to the service related to purchasing the commercial products, but the present invention is not limited thereto. According to some embodiments, the operation of updating the default space may be omitted, where the default space corresponds to the service related to purchasing the commercial products.

In Step 914, the processing circuit 110P controls the HMD device 105D to provide the menu for allowing the user to open the menu. For example, the user may use the controller corresponding to the physical controller in his/her right hand to point to a trigger point of the store, such as a video object representing the store, to trigger the menu of the store. Upon trigger by the user, the processing circuit 110P controls the HMD device 105D to display the menu. According to this embodiment, the menu may comprise a plurality of items such as that mentioned above (e.g. the items corresponding to the commercial products, respectively), and the processing circuit 110P may control the HMD device 105D to display the menu comprising the plurality of items, to allow the user to select an item of the plurality of items with aid of a controller such as one of the two controllers.

In Step 916, the processing circuit 110P controls the HMD device 105D to display video contents (e.g. the items of the menu, such as that corresponding to the commercial products in the store, respectively) for allowing user to browse all commodities. For better comprehension, the commodities can be taken as examples of the commercial products, but the present invention is not limited thereto.

In Step 918, when the user choose a commodity (e.g. one of the commodities), the processing circuit 110P retrieves the information regarding the commodity, since the user may intend to know more details of it. The commodity can be taken as an example of the product corresponding to the item selected by the user, but the present invention is not limited thereto. According to this embodiment, the processing circuit 110P controls the HMD device 105D to display the entrance video object as the entrance point, where the entrance point is utilized for purchasing the product (e.g. the commodity chosen by the user).

In Step 920, the processing circuit 110P checks if it provides one or more assets. According to this embodiment, the developer of the product may have taken the set of one or more scenes and the set of one or more objects from the product, to provide the simulation system 100 with the associated information (e.g. the aforementioned set of one or more assets of the product) through the workflow shown in FIG. 7. As shown in FIG. 9, when it provides the one or more assets, Step 922 is entered; otherwise, Step 924 is entered.

In Step 922, the processing circuit 110P downloads the assets belonging to the commodity and dynamically changes the space, to allow the user to preview and explore the assets and/or interact with the assets. The assets belonging to the commodity can be taken as an example of the set of one or more assets, but the present invention is not limited thereto. For example, based on the presentation replacement configuration and the interaction configuration of the preview control scheme, the processing circuit 110P may control the HMD device 105D to display the predetermined space associated to the product (rather than the default space of the simulation environment) and the aforementioned at least one predetermined video object associated to the product (e.g. the predetermined video object that the user may interact with). After the original space (e.g. the default space or the update version thereof) is changed to the predetermined space, the user may preview and explore the assets of the commodity in the simulation environment, and even interact with the assets. Therefore, the present invention method such as the method 900 can provide interesting and immersive experience for the user to preview the commodity. As a result, the user may purchase it if the user is willing to do so.

In Step 924, the processing circuit 110P checks whether the user determines to purchase the product such as the commodity (labeled "Purchase" in FIG. 9, for brevity). When the user determines to purchase the product, Step 926 is entered; otherwise, Step 916 is entered.

In Step 926, the processing circuit 110P enters a purchase procedure, for handling some operations related to purchasing the product for the user.

Under control of the processing circuit 110P, the simulation system 100 may operate according to one or more of various control schemes of the method 900 (e.g. the preview control scheme, the presentation control scheme, and the interaction control scheme). Some implementation details regarding the method 900 are described in one or more of the above embodiments. For brevity, similar descriptions for this embodiment are not repeated in detail here.

Figure 10:
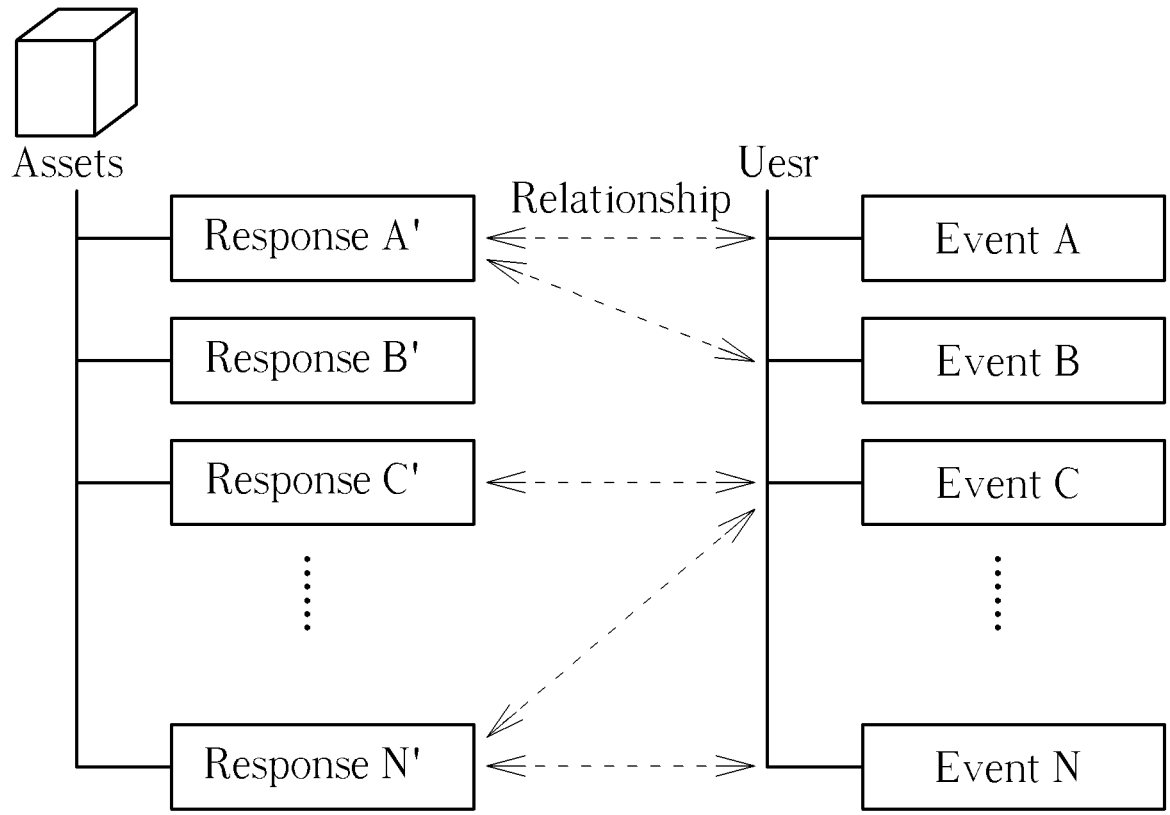
FIG. 10 illustrates some implementation details of the method shown in FIG. 9 according to an embodiment of the present application.

FIG. 10 illustrates some implementation details of the method 900 shown in FIG. 9 according to an embodiment of the present application. Based on the interaction mechanism implemented according to the method 900, the simulation system 100 allows the user to interact with the assets of the product (e.g. the commodity) when previewing the product. The developer can define one or more events such as the events {A, B, C, ..., N} for the user and define one or more responses such as the responses {A', B', C', ..., N'} for the assets, and may further define (e.g. build) the relationships between the events and the responses. As a result, under control of the processing circuit 110P, when the user triggers an event, the corresponding response of the assets will be fired. Examples of the events may include, but are not limited to: a controller button event (e.g. an event of the button of the physical controller), an event that one of the controllers touches the asset(s), etc. Examples of the responses may include, but are not limited to: playing animation of asset(s), playing audio of asset(s), etc. Examples of the relationships between the events and the responses may include, but are not limited to: one-on-one or one-to-one relationships (e.g. a relationship between an event and a response), many-to-one relationships (e.g. relationships between multiple events and a response, such as that between the events {A, B} and the response A' or that between the events {C, N} and the response N'), and one-to-many relationships (e.g. relationships between an event and multiple responses, such as that between the event C and the responses {C', N'}).

TABLE 1

| Welcome to XXX's Game Word! | | |
|---|---|---|
| APP(1) : Awesome! Join the dark side | 50$ | video |
| APP(2) : Awesome! Join the red side | 50$ | video |
| ... | ... | ... |
| APP(X) : Awesome! Join the blue side | 50$ | video |

Table 1 illustrates an example of the menu, where the symbol "..." may indicate that some table contents in Table 1 have been omitted for brevity. According to some embodiments, the menu may replace the text message next to the picture having the service name "VIVEPORT" and both of the two buttons respectively labeled "50$" and "video" in the simulation environment shown in any of FIGS. 4-6. For example, each of the items of the menu may comprise a text message of the corresponding product (e.g. an application such as one of the plurality of Apps {APP(1), APP(2), ..., APP(X)}), and may comprise a virtual button for purchasing the corresponding product through the corresponding entrance point, such as that labeled the price of the product (e.g. a virtual button labeled "50$" such as that in the corresponding row of Table 1), and may further comprise another virtual button for normal preview, such as that corresponding to a video clip, trailer, etc. (e.g. a virtual button labeled "video" such as that in the corresponding row of Table 1), but the present invention is not limited thereto. In addition, the processing circuit 110P may control the HMD device 105D to display an entrance video object of the item selected by the user as an entrance point, where the entrance point is utilized for purchasing the product corresponding to the item selected by the user.

For better comprehension, suppose that the plurality of items comprises a first item and a second item, such as any two of the rows respectively corresponding to the plurality of Apps {APP(1), APP(2), ..., APP(X)} in Table 1, and the plurality of products may comprise a first product corresponding to the first item and a second product corresponding to the second item. The processing circuit 110P may control the HMD device 105D to display multiple video objects of the plurality of items as entrance points, respectively, for purchasing the plurality of products corresponding to the plurality of items, respectively. In addition, when the item selected by the user is the first item (e.g. one of the rows respectively corresponding to the plurality of Apps {APP(1), APP(2), ..., APP(X)} in Table 1), the processing circuit 110P may control the HMD device 105D to display a first predetermined space associated to the first product as the predetermined space associated to the product, where the first predetermined space is different from the default space of the simulation environment, and the first predetermined space comprises the demonstration information of the first product. Additionally, when the item selected by the user is the second item (e.g. another of the rows respectively corresponding to the plurality of Apps {APP(1), APP(2), ..., APP(X)} in Table 1), the processing circuit 110P may control the HMD device 105D to display a second predetermined space associated to the second product as the predetermined space associated to the product, wherein the second predetermined space is different from the default space of the simulation environment, and the second predetermined space comprises the demonstration information of the second product. For brevity, similar descriptions for these embodiments are not repeated in detail here.

Figure 11:
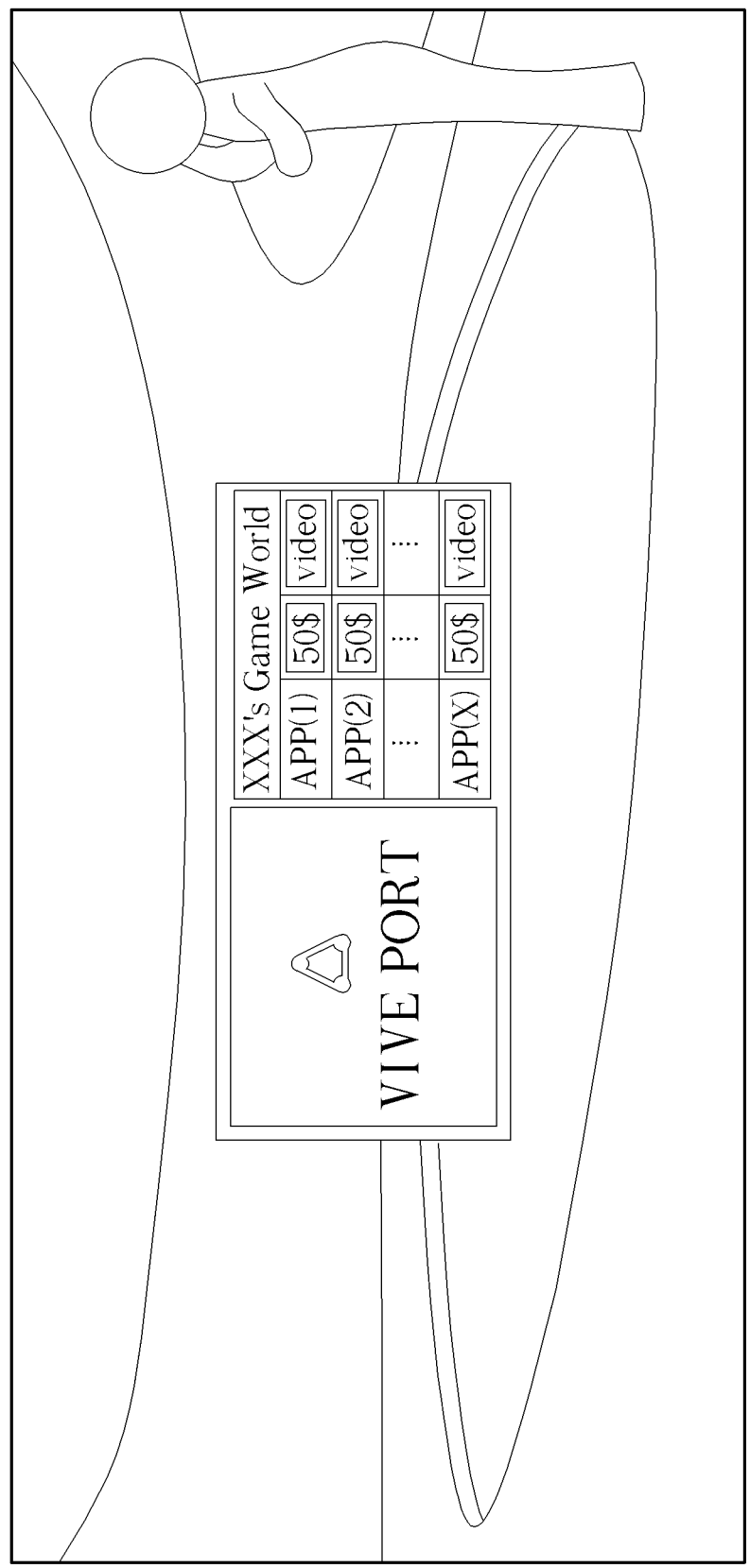
FIG. 11 illustrates a preview control scheme applied to the simulation system shown in FIG. 1 according to an embodiment of the present application.

FIG. 11 illustrates a preview control scheme applied to the simulation system 100 shown in FIG. 1 according to an embodiment of the present application. As shown in FIG. 11, the processing circuit 110P may control the HMD device 105D to display the menu of the simulation environment, such as a reduction version of the example of the menu as illustrated with Table 1. For brevity, similar descriptions for this embodiment are not repeated in detail here.

Figure 12:
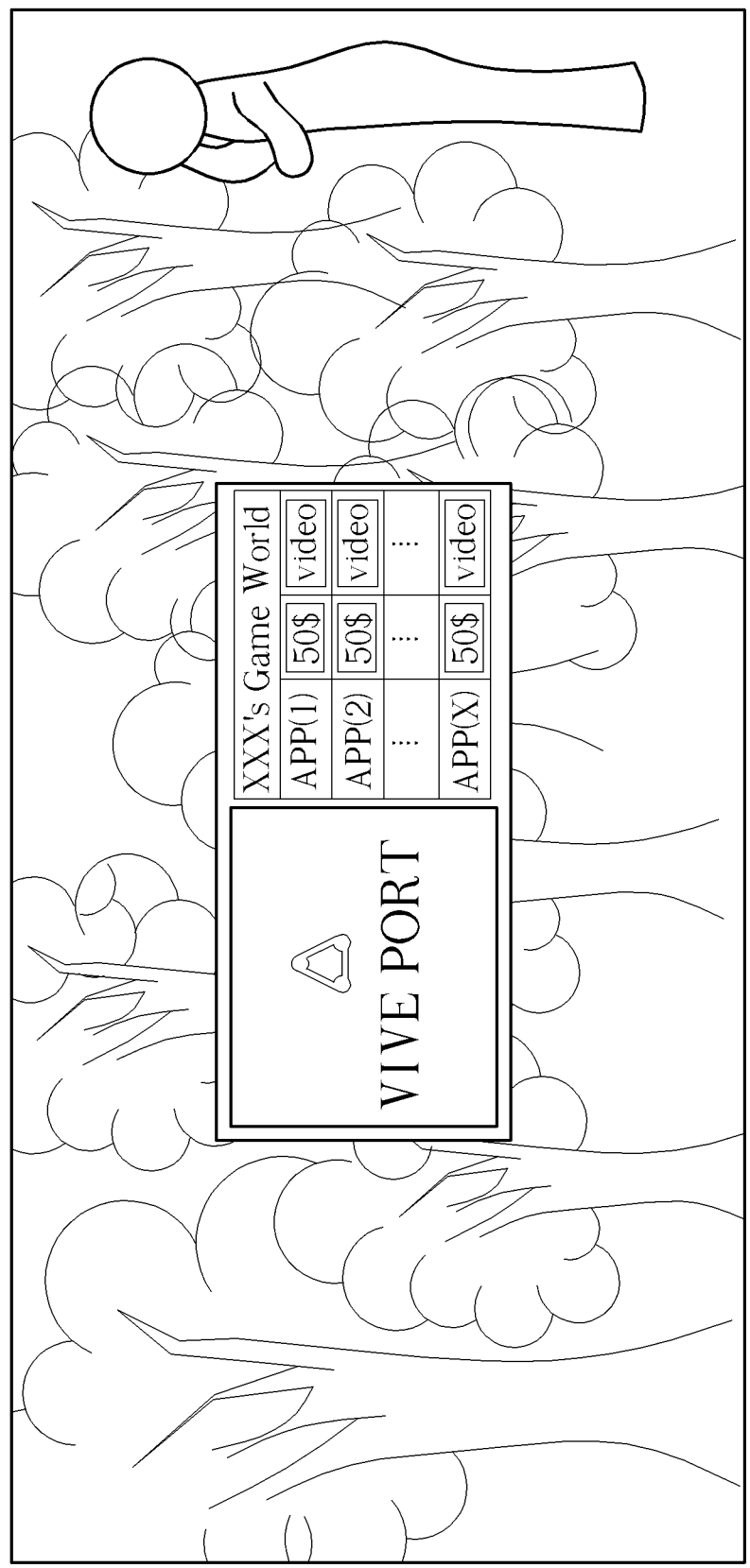
FIG. 12 illustrates a presentation replacement configuration of the preview control scheme shown in FIG. 11 according to an embodiment of the present application.

FIG. 12 illustrates a presentation replacement configuration of the preview control scheme shown in FIG. 11 according to an embodiment of the present application. As shown in FIG. 12, the processing circuit 110P may control the HMD device 105D to display the predetermined space associated to the product and the menu of the simulation environment (e.g. the reduction version of the example of the menu as illustrated with Table 1) at the same time. For brevity, similar descriptions for this embodiment are not repeated in detail here.

Figure 13:
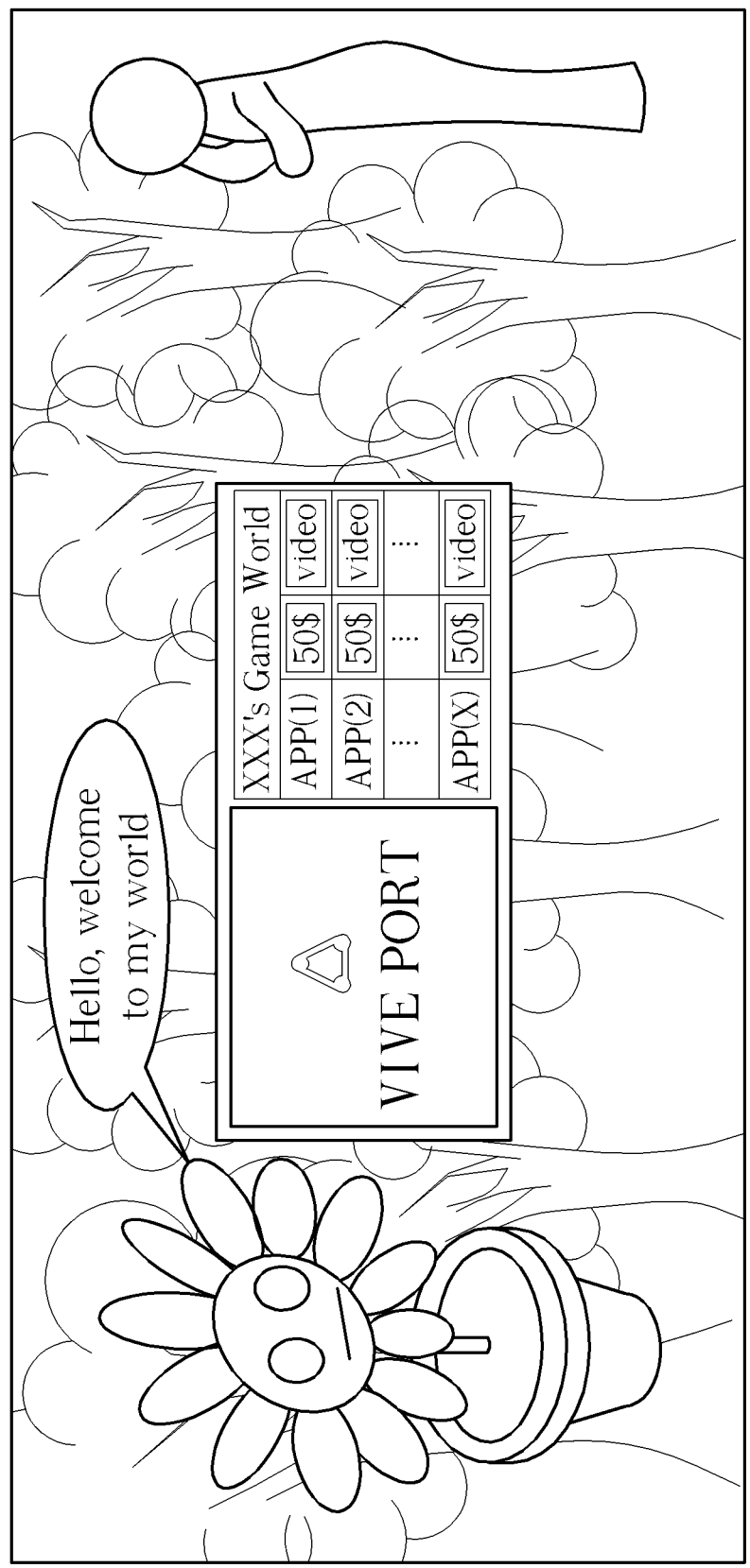
FIG. 13 illustrates an interaction configuration of the preview control scheme shown in FIG. 11 according to an embodiment of the present application.

FIG. 13 illustrates an interaction configuration of the preview control scheme shown in FIG. 11 according to an embodiment of the present application. As shown in FIG. 13, the processing circuit 110P may control the HMD device 105D to display the predetermined space associated to the product, the aforementioned at least one predetermined video object associated to the product (e.g. the virtual character model of the product, such as the virtual creature, etc. of the game), and the menu of the simulation environment (e.g. the reduction version of the example of the menu as illustrated with Table 1) at the same time. For brevity, similar descriptions for this embodiment are not repeated in detail here.

According to some embodiments, the platform for providing the service, such as the VR shopping platform of the store, can import the developer's contents, examples of which may include, but are not limited to: three-dimensional (3D) models and scenes. As a result, users of the product (e.g. the user) may have interactive activities regarding the commodity, and more particularly, may interact with the corresponding 3D model(s) and scene(s). It will make the users feel real in the VR shopping platforms.

According to some embodiments, the architecture implemented according to the present invention method (e.g. the method 900) may vary. Some implementation details of the architecture are described as follows:

(1). Exporter for developers to export their promote assets.

To promote the commodity in VR, the developers can set the events and behaviors to the assets, which can be imported into the VR shopping platforms. There may be at least three items that the developers can provide for the users.

i. Promoted asset can be featured but not limited to 3D scenes, 3D objects, audio, animations and interactive events. Developers can combine various types of assets which can be presented in VR into the specifically promoted objects. Based on such features, the developers can use the character of virtual reality to promote their applications or commodities in the VR environment. For example, the difference between the proposed asset(s) and 360-degree video may be: the users of the present invention apparatus such as the simulation system 100 can interact with the asset(s) but the 360-degree video cannot provide such experience; and the users the present invention apparatus such as the simulation system 100 can change their position in the asset (s), but the 360-degree video cannot provide such experience.

ii. Developer can design asset's own event/interaction logic. To present the promoted asset and be good at using the characteristic of VR, the developers can set up the assets' behaviors which may be triggered by specific events. In the VR shopping platform, the users can use one of the specific events to trigger the corresponding behaviors of the promoted assets.

iii. Exporter can pack these assets in encrypted format to upload to the server.

Exporter may provide the developers with one or more user interfaces (UIs) for setting up the associated parameters such as that for uploading assets from the developers. After the settings, the assets can be packaged into a specific encrypted format. Developers may update it on the server. While the users go into the VR shopping platform, they can select a target commodity that includes the promoted assets to experience the atmosphere of the application provided by the developers.

(2). Server for handling uploaded assets from developer.

All of the assets can be updated to a server such as that mentioned above. The developers can continue updating the subsequent version(s) of the assets, in order to provide variety of assets.

(3). Importer for loading the assets into the present invention apparatus (e.g. the simulation system 100) such as the store VR client device in runtime.

The VR store client device can download the promoted assets of the product such as the application (App) from the server. Based on the present invention method, the store VR client device can handle the version control and the behaviors of each of the assets.

(4). Store VR client device i. Store may have the default space such as a default VR space and the associated menu system.

The environment of the VR shopping platform may include the VR space and the menu system. Both of them can be the key points to implement the architecture of the present invention.

ii. User can browse commodities through the menu system.

When the users fall into the VR shopping platform, they can browse all commodities by the menu system. If the users feel that the application is interesting, they can select it to get preview of the application.

iii. User can preview the commodity's assets by replacing the default space such as the default scene.

The VR system can provide users with experience of immersion. The users can select the application from the menu system. Based on the present invention, they will feel they are really in the world provided by assets properly designed by the developers, not only sit in front of the PC and use mouse to browse the commodity's photos or videos. Therefore, they can preview the assets in the VR world. By the setting from the developers, the users can interact with the assets. Through the specific events, the corresponding behaviors may be triggered. The architecture of the present invention is good at using VR characteristic to present the product such as the application (App).

iv. User can purchase the commodity.

While the users preview the assets and feel that the applications or commodities are interesting, they can purchase directly in the VR world.

According to some embodiments, each of the VR system 10 shown in FIG. 2 and the VR system shown in FIG. 3 maybe configured to become an AR system or an MR system, any of which can be taken as an example of the simulation system 100. For example, the HMD apparatus 104 shown in FIG. 2 may comprise one or more cameras arranged to capture images of the real space, such as images of what may be seen by the user in the real space if the user takes off the HMD apparatus 104. The HMD apparatus 104 may send at least one portion (e.g. a portion or all) of image data of these images of the real space to the host device 102 through the transmission cable 106 (e.g. through a wired connection such as that for the information INFO$_s$). According to the aforementioned at least one portion (e.g. a portion or all) of the image data, the HMD apparatus 104 (more particularly, the processor of the computing device therein) may blend any of these images of the real space with the video content obtained from the multimedia source or the video content of one or more virtual objects to be viewed by the user wearing the HMD apparatus 104, to generate the multimedia content CXT. As a result, the VR environment presented through the HMD apparatus 104 shown in FIG. 2 becomes the associated AR environment or the associated MR environment. For another example, the HMD apparatus 30 shown in FIG. 3 may comprise one or more cameras arranged to capture images of the real space, such as images of what may be seen by the user in the real space if the user takes off the HMD apparatus 30. The HMD apparatus 30 may send at least one portion (e.g. a portion or all) of image data of these images of the real space to the host device 20 through wireless transmission (e.g. through a wireless connection such as that for the information INFO$_s$). According to the aforementioned at least one portion (e.g. a portion or all) of the image data, the HMD apparatus 30 (more particularly, the processor of the computing device therein) may blend any of these images of the real space with the video content obtained from the multimedia source or the video content of one or more virtual objects to be viewed by the user wearing the HMD apparatus 30, to generate the multimedia content CXT. As a result, the VR environment presented through the HMD apparatus 30 shown in FIG. 3 becomes the associated AR environment or the associated MR environment. For brevity, similar descriptions for these embodiments are not repeated in detail here.

Regarding the terms AR and MR, MR may be regarded as the merging of real and virtual worlds to produce new environments and visualizations where physical and digital objects may, for example, co-exist and/or interact in real time. MR may take place in the physical world and/or the virtual world, and may be a mix of reality and VR, encompassing both AR and augmented virtuality. According to some embodiments of the present invention, the degree, the percentage, and/or the way of the above blending operation(s) may cause whether the VR environment becomes the AR environment or the MR environment. For brevity, similar descriptions for these embodiments are not repeated in detail here.

According to some embodiments, the host device 105H and the HMD device 105D may be integrated into the same device, such as a simulation device, and the processing circuit 110P may control operations of this device. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for providing demonstration information in a simulation environment, the method being applicable to a simulation system, the simulation system being one of a virtual reality (VR) system, an augmented reality (AR) system, and a mixed reality (MR) system, the method comprising:
controlling a head mounted display (HMD) device of the simulation system to present the simulation environment and allow a user of the simulation system to see the simulation environment when wearing the HMD device on the user's head;
controlling the HMD device to display a first controller in the simulation environment, to allow the user to interact with the simulation environment;
controlling the HMD device to display a menu comprising a plurality of items, to allow the user to select an item of the plurality of items with aid of the first controller; and
controlling the HMD device to display a predetermined space associated to a product corresponding to the item, wherein the predetermined space is different from default space of the simulation environment and is displayed as a replacement of the default space wherein when the predetermined space is displayed the default space is not displayed, and the predetermined space comprises demonstration information of the product and is displayed to demonstrate the product while concurrently displaying the menu in the predetermined space, to switch between demonstrating different products through different entrance points corresponding to different items within the plurality of items for the user in response to user selection on the menu that is concurrently displayed, for continuously providing immersive experience for the user during the user selection;
wherein the predetermined space associated to the product and the menu of the simulation environment are displayed at the same time.

2. The method of claim 1, wherein the default space of the simulation environment is not associated to the product.

3. The method of claim 1, wherein the default space of the simulation environment corresponds to a service related to purchasing commercial products, and the product is one of the commercial products.

4. The method of claim 1, wherein controlling the HMD device to display the predetermined space associated to the product further comprises:
controlling the HMD device to display the predetermined space associated to the product, rather than the default space of the simulation environment.

5. The method of claim 1, wherein controlling the HIVID device to display the predetermined space associated to the product further comprises:
controlling the HMD device to display the predetermined space associated to the product, to replace the default space of the simulation environment with the predetermined space.

6. The method of claim 1, further comprising:
controlling the HMD device to display at least one predetermined video object associated to the product, to allow the user to interact with the at least one predetermined video object associated to the product.

7. The method of claim 6, wherein the at least one predetermined video object associated to the product comprises a virtual character model of the product.

8. The method of claim 6, wherein the product is an application.

9. The method of claim 1, further comprising:
controlling the HMD device to display an entrance video object of the item as an entrance point, wherein the entrance point is utilized for purchasing the product corresponding to the item.

10. The method of claim 1, wherein the plurality of items comprises a first item and a second item; and the method further comprises:
controlling the HMD device to display multiple video objects of the plurality of items as entrance points, respectively, for purchasing a plurality of products corresponding to the plurality of items, respectively, wherein the plurality of products comprises a first product corresponding to the first item and a second product corresponding to the second item;
when the item selected by the user is the first item, controlling the HMD device to display a first predetermined space associated to the first product as the predetermined space associated to the product, wherein the first predetermined space is different from the default space of the simulation environment, and the first predetermined space comprises demonstration information of the first product; and
when the item selected by the user is the second item, controlling the HMD device to display a second predetermined space associated to the second product as the predetermined space associated to the product, wherein the second predetermined space is different from the default space of the simulation environment, and the second predetermined space comprises demonstration information of the second product.

11. A simulation system for providing demonstration information in a simulation environment, the simulation system being one of a virtual reality (VR) system, an augmented reality (AR) system, and a mixed reality (MR) system, the simulation system comprising:
a head mounted display (HMD) device, configured to present the simulation environment and allow a user of the simulation system to see the simulation environment when wearing the HMD device on the user's head; and a processing circuit, coupled to the HMD device, configured to perform information processing for the HIVID device, wherein the processing circuit controls the HIVID device to perform the following operations:

displaying a first controller in the simulation environment to allow the user to interact with the simulation environment;

displaying a menu comprising a plurality of items, to allow the user to select an item of the plurality of items with aid of the first controller; and displaying a predetermined space associated to a product corresponding to the item, wherein the predetermined space is different from default space of the simulation environment and is displayed as a replacement of the default space wherein when the predetermined space is displayed the default space is not displayed, and the predetermined space comprises demonstration information of the product and is displayed to demonstrate the product while concurrently displaying the menu in the predetermined space, to switch between demonstrating different products through different entrance points corresponding to different items within the plurality of items for the user in response to user selection on the menu that is concurrently displayed, for continuously providing immersive experience for the user during the user selection;

wherein the predetermined space associated to the product and the menu of the simulation environment are displayed at the same time.

12. The simulation system of claim 11, wherein the default space of the simulation environment is not associated to the product.

13. The simulation system of claim 11, wherein the default space of the simulation environment corresponds to a service related to purchasing commercial products, and the product is one of the commercial products.

14. The simulation system of claim 11, wherein the processing circuit controls the HMD device to display the predetermined space associated to the product, rather than the default space of the simulation environment.

15. The simulation system of claim 11, wherein the processing circuit controls the HMD device to display the predetermined space associated to the product, to replace the default space of the simulation environment with the predetermined space.

16. The simulation system of claim 11, wherein the processing circuit controls the HMD device to display at least one predetermined video object associated to the product, to allow the user to interact with the at least one predetermined video object associated to the product.

17. The simulation system of claim 16, wherein the at least one predetermined video object associated to the product comprises a virtual character model of the product.

18. The simulation system of claim 16, wherein the product is an application.

19. The simulation system of claim 11, wherein the processing circuit controls the HMD device to display an entrance video object of the item as an entrance point, wherein the entrance point is utilized for purchasing the product corresponding to the item.

20. The simulation system of claim 11, wherein the plurality of items comprises a first item and a second item; the processing circuit controls the HMD device to display multiple video objects of the plurality of items as entrance points, respectively, for purchasing a plurality of products corresponding to the plurality of items, respectively, wherein the plurality of products comprises a first product corresponding to the first item and a second product corresponding to the second item; when the item selected by the user is the first item, the processing circuit controls the HMD device to display a first predetermined space associated to the first product as the predetermined space associated to the product, wherein the first predetermined space is different from the default space of the simulation environment, and the first predetermined space comprises demonstration information of the first product; and when the item selected by the user is the second item, the processing circuit controls the HMD device to display a second predetermined space associated to the second product as the predetermined space associated to the product, wherein the second predetermined space is different from the default space of the simulation environment, and the second predetermined space comprises demonstration information of the second product.

* * * * *